Figure 1:
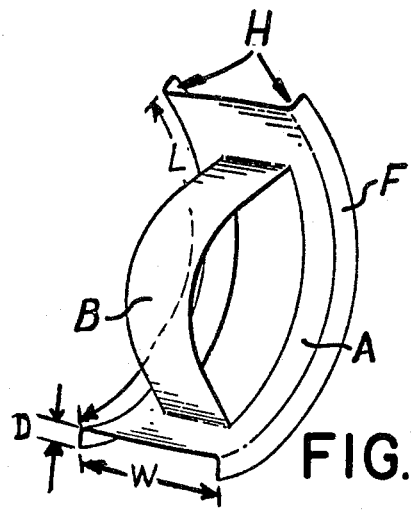

United States Patent [19]

Ellis et al.

[11] 4,333,892
[45] Jun. 8, 1982

[54] DUMPED PACKINGS AND APPARATUS COMPRISING SUCH DUMPED PACKINGS

[75] Inventors: Stephen R. M. Ellis, Surby, Near Port Erin, Isle of Man; Ronald Priestley, Kings Heath, England

[73] Assignee: Citten Limited, England

[21] Appl. No.: 67,395

[22] Filed: Aug. 17, 1979

Related U.S. Application Data

[63] Continuation-in-part of Ser. No. 824,206, Aug. 12, 1977, abandoned, which is a continuation of Ser. No. 653,006, Jan. 28, 1976, abandoned.

[30] Foreign Application Priority Data

Jan. 29, 1975 [GB] United Kingdom ............... 3943/75

[51] Int. Cl.³ .............................................. B01F 3/04
[52] U.S. Cl. ....................................... 261/94; 261/98; 261/DIG. 72
[58] Field of Search ...................... 261/94–98, 261/DIG. 72

[56] References Cited

U.S. PATENT DOCUMENTS

| | | | |
|---|---|---|---|
| D. 232,174 | 7/1974 | La Borde | 261/DIG. 72 |
| D. 232,236 | 7/1974 | La Borde | 261/DIG. 72 |
| D. 232,237 | 7/1974 | La Borde | 261/DIG. 72 |
| D. 232,238 | 7/1974 | La Borde | 261/DIG. 72 |
| 2,602,651 | 7/1952 | Cannon | 261/DIG. 72 |
| 2,834,466 | 5/1958 | Hament | 261/DIG. 72 |
| 3,266,787 | 8/1966 | Eckert | 261/DIG. 72 |
| 3,484,513 | 12/1969 | Paoli | 261/DIG. 72 |
| 3,618,910 | 11/1971 | Arndt | 261/DIG. 72 |
| 4,041,113 | 8/1977 | McKeown | 261/DIG. 72 |

FOREIGN PATENT DOCUMENTS

| | | | |
|---|---|---|---|
| 316497 | 12/1918 | Fed. Rep. of Germany | 261/94 |
| 1029346 | 5/1958 | Fed. Rep. of Germany | 261/DIG. 72 |
| 1405374 | 3/1964 | France | 261/DIG. 72 |
| 49-29640 | 8/1974 | Japan | 261/DIG. 72 |
| 49-34579 | 9/1974 | Japan | 261/DIG. 72 |
| 768316 | 2/1957 | United Kingdom | 261/95 |
| 917906 | 2/1963 | United Kingdom | 261/DIG. 72 |
| 1385672 | 2/1975 | United Kingdom | 261/DIG. 72 |
| 1385673 | 2/1975 | United Kingdom | 261/DIG. 72 |

*Primary Examiner*—Gregory N. Clements
*Attorney, Agent, or Firm*—Leydig, Voit, Osann, Mayer and Holt

[57] ABSTRACT

This invention relates to dumped packings for use in gas/liquid contact apparatus and analogous apparatus. The dumped packings consist of a plurality of packing elements of specific configuration to provide packings with good characteristics in use. Each element consists of a generally elongate curved or polygonal base member which is substantially flat transversely but extends 90° to 270° about the notional axis of the curve or polygon to form an open shape extending generally in a plane perpendicular to that notional axis. The base member includes one or more elongate apertures bridged by elongate bridges integral with the base member and of opposite sense curvature. This construction gives packing elements which combine high strength with good mass transfer performance.

11 Claims, 16 Drawing Figures

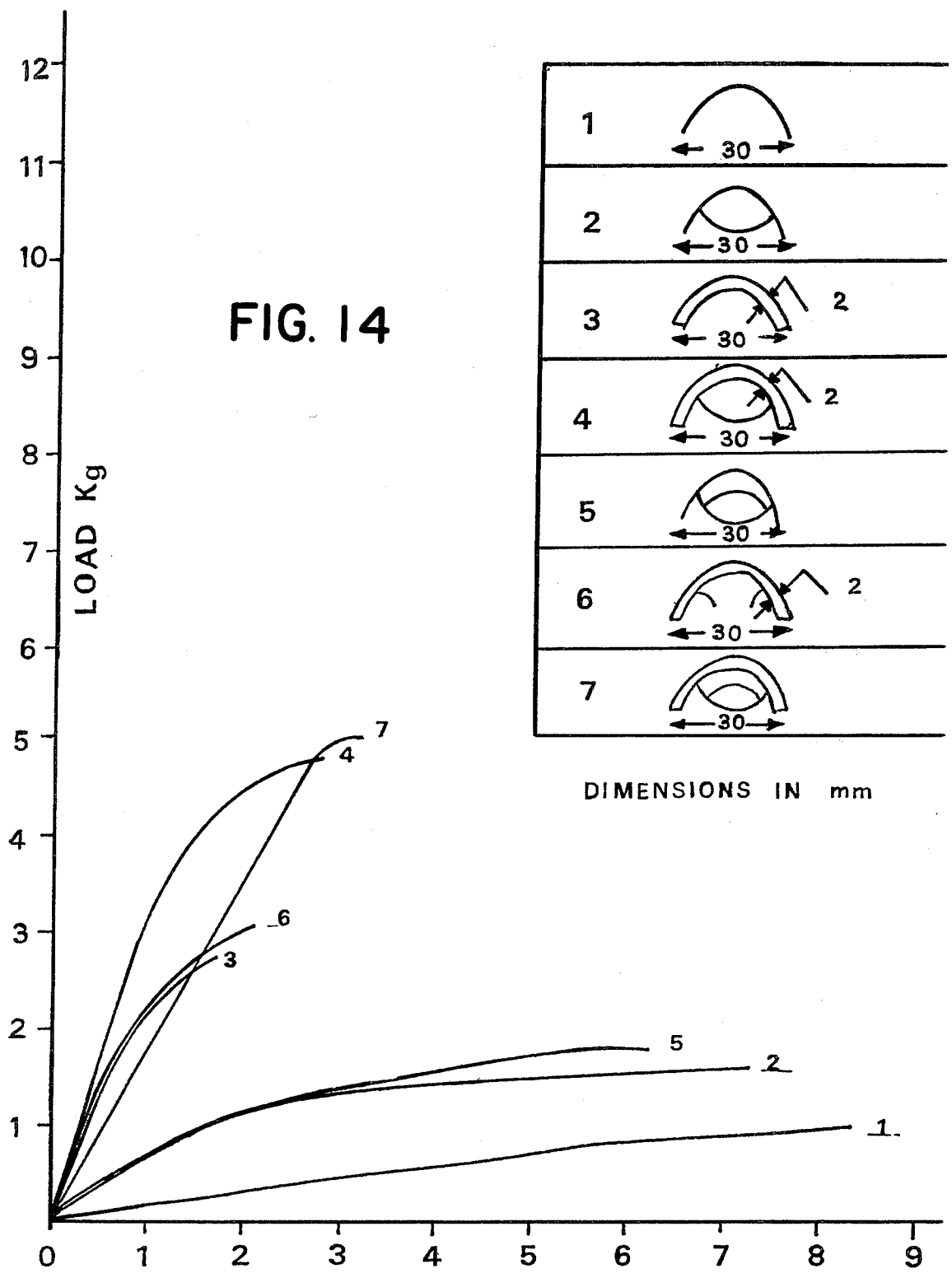
FIG. 14 PACKING RING LOAD — DEFLECTION CHARACTERISTICS

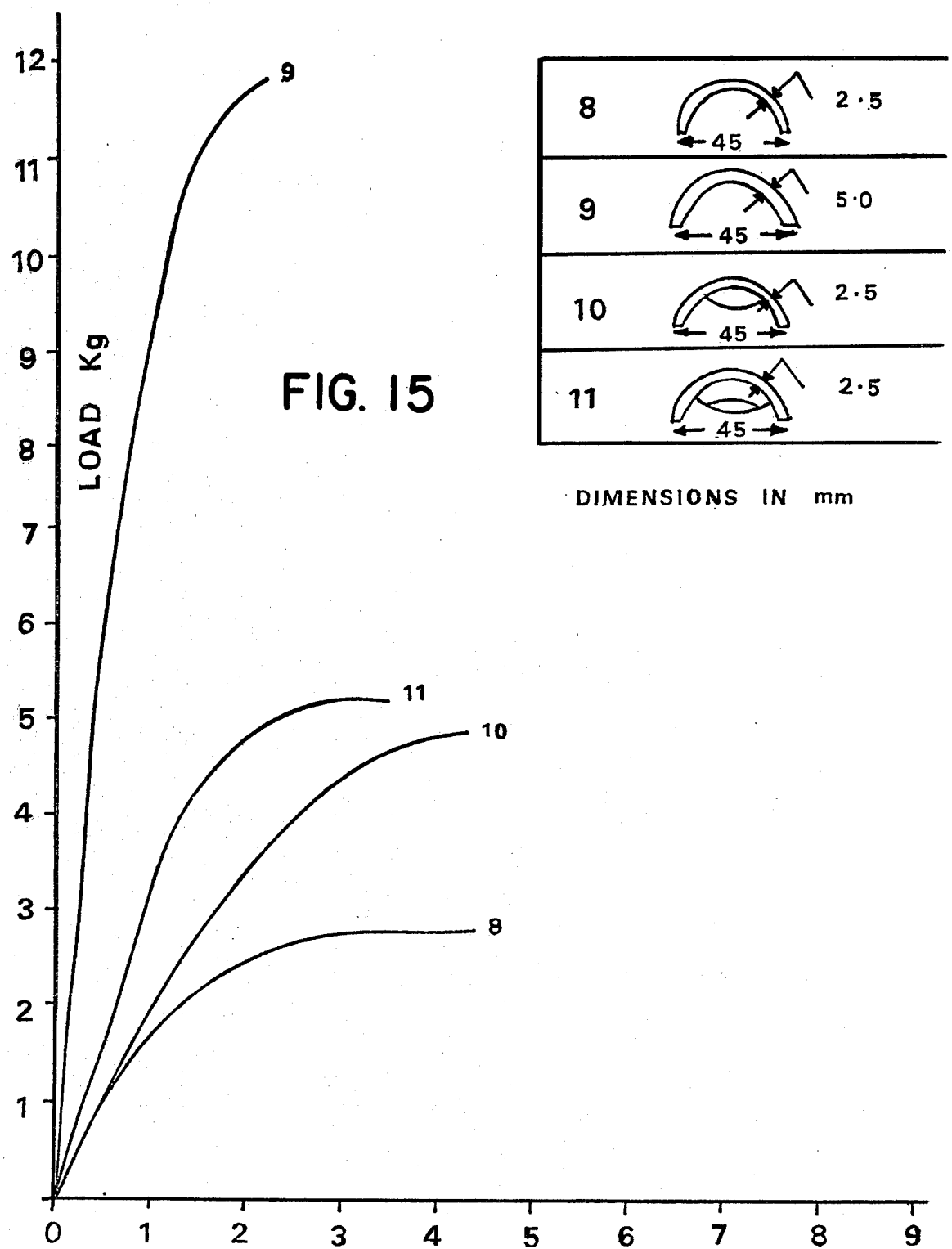
FIG. 15 PACKING RING LOAD — DEFLECTION CHARACTERISTICS

DUMPED PACKINGS AND APPARATUS COMPRISING SUCH DUMPED PACKINGS

CROSS REFERENCE TO RELATED APPLICATION

This application is a continuation in part of our co-pending application No. 824,206 filed Aug. 12, 1977, abandoned which itself was a continuation of our earlier application No. 653,006 filed Jan. 28, 1976, now abandoned.

FIELD OF THE INVENTION

This invention relates to dumped packings and apparatus comprising such dumped packings.

BACKGROUND OF THE INVENTION

There are many areas of technology in which a liquid is contacted with a gas or vapour in a column packed with packing material. Examples of such processes are distillation processes, absorption and desorption processes, gas cleaning and scrubbing processes, liquid cooling processes, gas drying processes and biological processes including biological or percolation filters. Such processes find widespread use in process technology such as in water treatment, particularly effluent treatment, and in process chemistry.

In the past a wide variety of processes of this type have been carried out using packed columns. The number and variety of packings used to pack such columns is very wide. The packing elements may be arranged to form a regular array inside the column or they may be randomly distributed in the column or distributed on some intermediate basis. Random and partially random arrays are usually obtained by dumping a large number of individual small packing elements into the tower.

Numerous examples of dumped packing elements are known from the patent literature, for example those described in German Auslegeschrifts Nos. 1029346 and 1129931, U.S. Pat. No. Re. 27,217, German Pat. No. 316497, U.S. Pat. Nos. 3,266,787, 3,618,910, 2,834,466, 2,602,651, 3,484,513, 3,167,600, 3,311,356, 3,957,931 and 4,041,113 and British Pat. Nos. 768,316, 917,906, 1,385,672 and 1,385,673 and Japanese Utility Model Publication No. 29640/74.

Japanese Utility Model Publication No. 29640/74 discloses the use of packing elements which consist of a deep, short, arcuate trough the base of which has been pressed out to form an oppositely directed bridge.

A number of desiderata apply to elements for use in dumped packings. First of all, the gas/liquid contact efficiency of the packing must be satisfactory for the intended purpose and preferably it should be as efficient as possible. One, though by no means the only, way of enhancing efficiency is to ensure that the packing elements have a high surface area per unit volume of the dumped packing. Another desideratum is that the packing elements should flow easily to form the dumped packing and should not tend when dumped to orient themselves preferentially in any particular way which would have an adverse effect on the performance of the packing. In addition the individual elements should be strong enough that the lowermost elements in a bed of dumped packing elements do not collapse under the weight of the bed above them. A further desirable quality in a dumped packing is that the resistance to gas or vapour flow through the packing should be relatively low.

It is an object of the present invention to provide dumped packings having improved properties relative to previously known packings in one or more of the foregoing respects.

GENERAL DESCRIPTION OF THE INVENTION

According to a first feature of the present invention there is provided a dumped packing for use in gas/liquid contact apparatus consisting of a plurality of packing elements, each packing element comprising an elongate base member which is substantially flat transversely and which longitudinally extends to an extent of 90° to 270° about a first notional axis to form an open shape extending generally in a plane perpendicular to said first notional axis, the base member including at least one elongate aperture bridged by a striplike bridging member integral with the base member and itself extending about a second notional axis parallel to the first notional axis, the sense of the base member being opposite to the sense of the bridging member.

When a short straight line, parallel to but spaced from an axis, is rotated about that axis, it traces out a surface in space. The notional axis referred to above is the axis which, when such a line is rotated about it, most closely generates the shape of the elongate base of the actual element, or (if the element has a polygonal rather than an arcuate base) the shape of the corresponding arcuate base passing through the vertices of the polygonal base. In many cases, packing elements constructed in accordance with the present invention are simple geometrical shapes and have a genuine axis of rotation. However, the base of the element need not be an arc of a circle but may be an arc of an ellipse or other closed regular curve, or it may even be a spiral arc. In each case the notional axis is one which produces a "best fit". Many simple packing elements according to the invention are symmetrical, and extend about 180° about the notional axis. In this case the notional axis is substantially the intersection of the transverse plane of symmetry of the element and the plane joining the two ends of the base member.

Another way of looking at the shapes of the packing elements of the invention is to observe that the angle between perpendiculars dropped from the ends of the base member, that angle including the element itself, is 90° to 270°.

The packing elements of the invention advantageously have side walls on the edges of the elongate base, thereby giving the elements the form of curved/polygonal troughs. The dimensional relationships between parts of the elements of the invention may vary widely, but are ultimately determinative of the characteristics of the dumped packing.

Three dimensions can be associated with most types of packing element according to the invention, viz. a base length "L" being the length of the base element measured along its centre, (note that since the base of the element is longitudinally curved or polygonal, the "base length" is greater than the straight line distance between the two ends of the base), the width W of the base, and the depth D of the trough formed by the presence of sidewalls of the base.

Preferably, the ratio of L:W is at least 3.0, but less than 5.0. Preferably, when side walls are present, L:D is greater than 6 and/or W:D is greater than 6.

The strip-like bridging member of each element may itself be apertured e.g. by a further bridge member spanning an aperture in the strip-like bridging member or by one or more projections extending from the sides of an aperture formed therein.

The strip-like bridging member preferably spans at least 65% of the arcuate extent of the base member, i.e. the distance along the base member between the ends of the bridging member is at least 65% of the length "L".

Preferably the base member of the packing element extends about the notional axis to an extent of 170° to 190° i.e. the base member of each element is approximately in the shape of half a hollow cylinder or frustocone or half of a polygon having at least 4 sides. Such a polygon may be regular or irregular but preferably has 6 or more sides and is substantially regular.

It is found that the provision of walls on the sides of the base member increases the strength of the packing element, particularly the compressive strength across the ends of the element, while still retaining good gas-/liquid contact in dumped packings formed of the elements. The perforation of the base member and provision of the projecting member(s) (both the bridging member and any further bridging member or tags) give a more open structure, a lower pressure drop and minimises interlocking of the packing elements. It is important to increase the strength and rigidity of the individual packing elements as far as possible in order to minimise the risk of packing elements at the bottom of a dumped bed collapsing. In addition to the strength imparted by the side walls, the provision of such side walls aids the liquid distribution by defining spaced, parallel liquid distribution channels shown in the embodiments of the invention illustrated in the drawings as generally V-shaped grooves H (FIG. 1) near each edge of the base member at the intersection between the side walls and the base and extending longitudinally of the base member. The side walls further influence the spacing of the elements in the dumped packing to give a lower pressure drop and higher capacity.

Striplike projecting members on the packing element, whether tags or bridging members, may be curved along their length and be transversely flat, or they may be arched both longitudinally and transversely.

Packing elements for use in packings according to the present invention may be made from a wide variety of appropriate materials known for making such elements. Naturally the choice of material will affect the possibilities of forming the element and in the opposite sense, certain shapes of element within the scope of the present invention will be difficult or impossible to make in certain materials. Thus for example the elements may be made of plastics materials e.g. by injection moulding, of ceramic material e.g. by extrusion and forming or by moulding, followed by subsequent firing, or they may be made of metal e.g. by punching, stamping and forming. The material of which the packing elements are made should clearly be one which will withstand the expected conditions of use of the dumped packing e.g. in terms of resistance to corrosion, dissolution or softening.

The general construction of the packing elements for use in packings according to the present invention is thus a moulded or deformed sheet of material. The surface of the material of the packing element may be plain or it may be otherwise than plain, for example corrugated, dimpled, grooved or the like. Such surface configurations may enhance the wetting properties of the elements. The materials of which the packing elements are made may also be solid or porous, e.g. the elements may be made of a perforated metal gauze or that may be made of a woven metal gauze or mesh or an analogous felted material, or of expanded metal mesh. When using certain materials of construction it may be desirable further to enhance the strength of the individual packing elements by providing strengthening members e.g. between the base member and some other part of the packing element. This technique is particularly valuable in the production of packing elements formed of synthetic plastics materials, e.g. by injection moulding.

The particular shape of the element may determine the optimum material of construction. For example, if the base member is substantially flat and has relatively vertical walls at each edge, and is made of sheet metal, the wall height cannot be very great without risk of cracking the metal, not usually more than $\frac{1}{4}''$. No such problem arises with plastics injection moulding, but that technique places other constraints on the shapes which can be made, e.g. the ability to split the mould to remove the formed shape.

The packings according to the present invention are distinguished from the packing elements of the prior art referred to above in a number of ways. Fundamentally, the packing elements of the present invention may be thought of as bent strips which are bent round in substantially only one direction but not so far round that they tend to form a ring shape. Because they are elongate and bent round only one axis they are also distinguished from various saddleshaped type of packings. They are also fundamentally distinguished from numerous packings based on the idea of "squareness" which results in packings having a preferential orientation when dumped, as contrasted with the random orientation of packings according to this invention, such as various types of Raschig and Pall rings, various saddle packings such as described in U.S. Pat. No. 3,618,910 and German Auslegeschrift No. 1029346 and British Pat. No. 768,316, and from generally square deformed plate types such as described in German Pat. No. 1,129,931 and U.S. Pat. No. 3,311,356, and ring packings such as described in U.S. Pat. No. 4,041,113.

In some cases, the individual packing elements of the packings according to the invention are similar to portions of known types of packing, but of course the performance of packing elements, both mechanical and mass transfer performance, depends on the overall element shape and not simply on constituent parts thereof. Thus, U.S. Pat. No. 4,041,113 discloses a flat ring type packing which, if bisected, would give two semi-circular elements which would constitute packing elements according to the present invention. However, ring packing elements which are approximately square as disclosed in said Patent tend to form a bed in which the rings preferentially orient substantially horizontally. The elements of the present invention tend to form a bed in which the elements are randomly oriented, resulting in better mass transfer performance of the dumped packings of the present invention.

The packing elements of the packings of the present invention are also distinguished from elongate arcuate saddle-type packings exemplified by that disclosed in Japanese Utility Model Publication 49-29640. In such packing elements, there is no generally transversely flat base member and the short length and wide width approaches the squareness of the packings referred to above, which together with the short perforating bridge in the middle of the element likely will produce a preferred orientation when dumped and a tendency to nest with adverse effects on the efficiency of the packing.

SPECIFIC DESCRIPTION OF PREFERRED EMBODIMENTS

The invention is illustrated by way of example only with reference to the accompanying drawings in which:

FIGS. 1 to 12 show in perspective view a number of packing element types according to the present invention.

Figure 13A:
Figure 13B:

FIGS. 13a and b illustrate in fragmentary cross section views of packing element material which has a surface which is corrugated or dimpled respectively.

FIGS. 14 and 15 are graphs of compressive strength for various packing elements indicated thereon.

Figure 2:
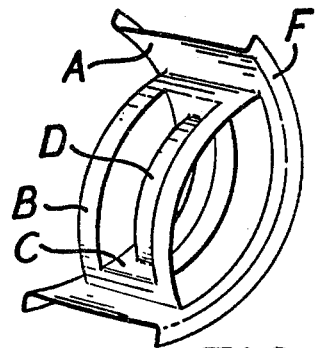
Figure 3:
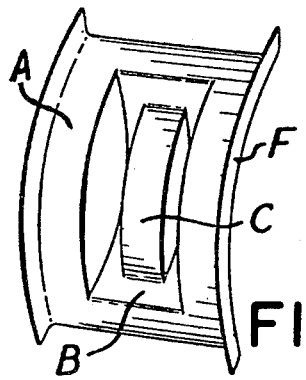
Figure 4:
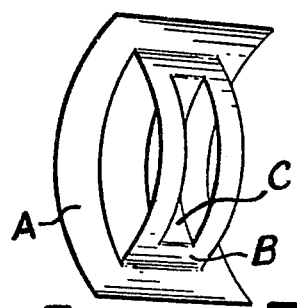
Figure 5:
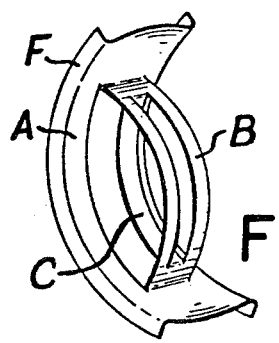
Figure 8:
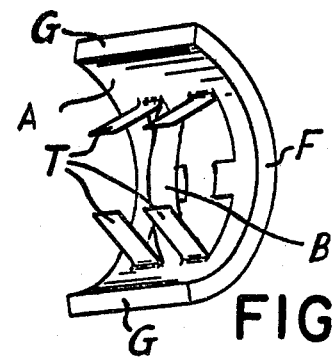
Figure 9:
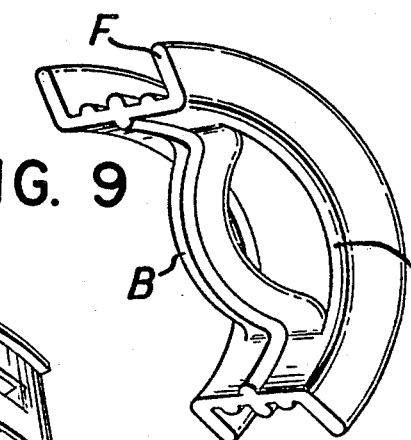
Figure 10:
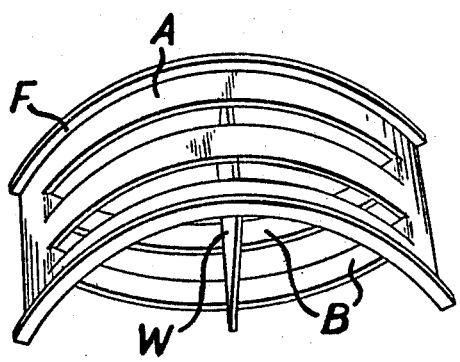
Figure 11:
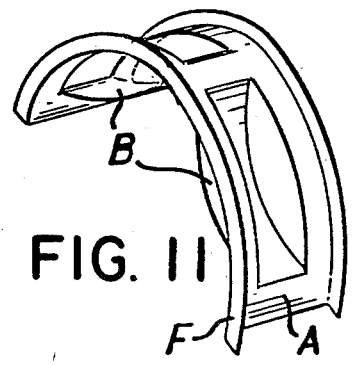

It will be seen that all of the packing elements illustrated on FIGS. 1 to 12 have an arcuate or polygonal base member A which extends about a notional axis. In section in a radial plane, base member A is substantially flat. The elements shown in FIGS. 1 to 3, 5, 6 and 8 to 12 also have upstanding side walls F, the ratio of the length of the base member (L in FIG. 1) to the height of walls F (D in FIG. 1) being always greater than 6. In each case, set on the base member A is an arcuate or part polygonal bridging section B spanning an aperture in the base member A. Such arcuate sections may be made by pressing out material in the embodiments shown in FIGS. 1 to 11 and 12. In the case of FIG. 10, this type must be moulded if it is to be made in one piece due to the presence of the bridge member W. In the case of FIGS. 2 to 5 and 7 secondary arcuate or part polygonal bridging members C are pressed from the primary bridging member B, these secondary sections being in the same sense as the base member. In the case of FIG. 2, there is a tertiary arcuate section D. Sections B, C and D may have a rectangular cross-section as shown or if desired may be curved transversely as well as longitudinally, i.e. so that they have a curved oblong cross-section. These secondary arcuate sections minimise interlocking of the elements when they are dumped to form a packing, and give a more effective use of the surface area of the packing element by reducing the pressure drop (and as a consequence improving the capacity) and improving the mass transfer performance.

Figure 6:
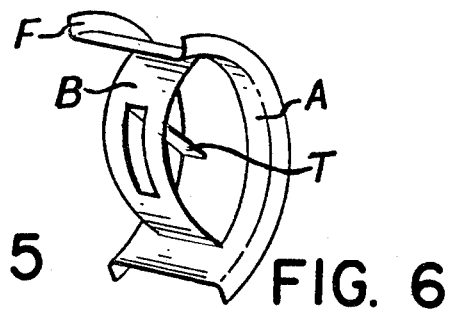
Figure 7:
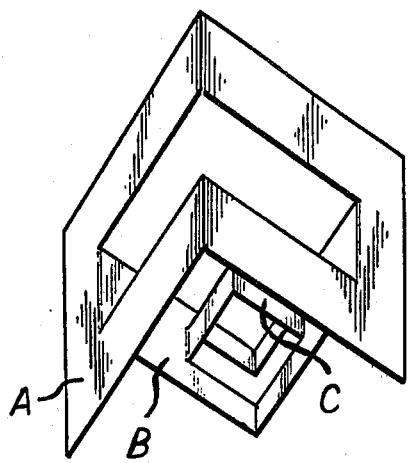
Figure 12:
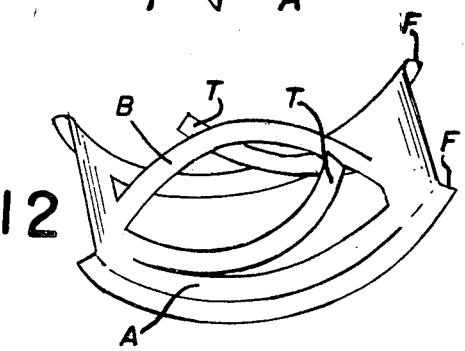

The elements shown in FIGS. 6, 8 and 12 each have punched out tags T to give the packing a more open structure, a lower pressure drop and higher capacity. In the case of FIG. 6, the tag T also minimises interlocking of the packing elements and ensures that they can be poured easily and quickly to form a generally random oriented bed of packing elements in appropriate apparatus. These tags T may be straight as shown in FIGS. 6 and 8, curved in one direction as shown in FIG. 12 or curved in two directions, i.e. longitudinally and transversely.

In the element shown in FIG. 8, the ends of the trough formed by base A and walls F are closed by flanges G.

Any of the elements of FIGS. 1 to 6 and 8 to 12 may be modified by having a non-arcuate base member, e.g. a base member made of 3, 4 or 5 flat sections forming half of a regular 6, 8 or 10-sided polygon respectively.

The elements shown in FIGS. 1 to 8, 11 and 12 are preferably made of sheet metal by cutting and stamping. That shown in FIG. 9 is made of fired ceramic, the unfired element being made either by moulding or by extrusion and forming while the element of FIG. 10 is preferably made of plastics by injection moulding.

All of the packing elements shown in FIGS. 1 to 12 are designed to fall and settle relatively randomly when they are dumped, e.g. into a suitable treatment tower or column. Put another way, the elements illustrated have no marked tendency to align themselves in the dumped bed, which is characteristic of many other types of elements.

The following Example shows the improved results achievable with packing elements according to the present invention.

EXAMPLE

Packing elements as shown in FIG. 1 were taken. The straight line distance from one end of the trough to the other was approximately one inch. This packing, made of 0.01" thick steel, was dumped into a 9 inch internal diameter column and air was passed through the column at a rate of 1000 or 2000 pounds per square foot per hour. The packing density of the packing elements was also noted and by way of comparison, equivalent tests were carried out on 1 inch diameter metal Pall rings, 1 inch ceramic saddles and on 1½ inch ceramic saddles (though using 12 inch internal diameter column).

The results are tabulated below:

| Packing | number per ft³ | ΔP/ft ins of water | |
|---|---|---|---|
| | | Air 1000 lbs/ft² hr | Air 2000 lbs/ft² hr |
| 1" Metal Pall Rings | 1330 | 0.17 | 0.72 |
| 1" Trough Metal Packing | 1670 | 0.13 | 0.48 |
| 1" Ceramic Saddle | 1940 | 0.22 | 0.85 |
| 1½" Ceramic Saddle in 12" diameter column | 710 | 0.18 | 0.63 |

The packing was then subjected to air/water humidification tests and it was found that the mass transfer coefficients for the packing according to the invention and the 1 inch and 1½ inch ceramic saddles were substantially equivalent. Under distillation conditions, the packing of the invention and the 1 inch Pall ring packing gave similar mass transfer results or HETP values. The HETP value is the height of an equivalent theoretical plate.

It is found that for a given strength, elements used in packings according to the present invention require less weight of material than the prior art packing elements. This enhances the resistance to crushing of the lowermost elements in deep beds, and is of course, of economic advantage in that a given bed requires less raw material to make a packing to fill it. This resistance to crushing arises in particular from the provision of side walls F, and FIGS. 14 and 15 illustrate this.

In each case, a set of comparable packing elements were made by cutting and stamping sheet metal blanks. The different elements are shown in side view in the box on the graph, and the dimensions are also given in the box in mm. Packings Nos. 4 and 10 on FIGS. 14 and 15 respectively are of the configuration shown in FIG. 1. Packing No. 7 on FIG. 14 and No. 11 on FIG. 15 are of the configuration shown in FIG. 5, and packing No. 6 of the configuration shown only in FIG. 14.

In order to test the strength of the packing element it was placed with its two ends between two pressure plates and an attempt made to push the two ends together. The graphs show the load in kg applied across the ends of the base member against the deflection measured in mm, i.e. the reduction in the straight line distance between the two ends of the packing element.

FIG. 14 shows clearly how the packing elements with a flat base member with walls at its edge (Nos. 3, 4, 6 and 7) were much more resistant to bending than those where the base member had no walls. FIG. 15 which shows curves for four other members shows that the stiffness and strength increase as the trough formed by the side walls becomes deeper (compare packing No. 9 with packing No. 8). Aperturing the base member with curved bridges across the aperture increases the strength further and (though this is not evident from FIGS. 14 and 15) greatly enhances the mass transfer efficiency of the packing.

We claim:

1. A dumped random packing for use in gas/liquid contact apparatus consisting of a plurality of packing elements each comprising: an elongate polygonal or curved trough-shaped base member having free ends and longitudinally extending from one free end to the other around a first notional axis to an extent of about 90° to about 270° to define a space which is at least partially enclosed by said base member, said base member having one or more elongated apertures for gas/liquid flow through said base member; and at least one bridging member carried by said base member extending about a second notional axis parallel to the first notional axis and in the opposite sense to the base member, at least partially through said space, said trough-shaped base member having side walls on the edges of said base member defining spaced, parallel liquid distribution channels, one near each edge of and extending longitudinally of said base member, and forming spacing members extending transversely of said first notional axis outwardly of said base member, said bridging member having an aperture and a projecting tag which extends into said space from at least one edge of said aperture, the combination of said free ended, apertured base member and bridging member integral therewith providing an open structure of low resistance to gas flow through said element and the trough-shape providing a structure which aids liquid distribution and provides strength to resist collapse of said element under compressive stresses in said dumped random packing.

2. A dumped random packing of elements according to claim 1 wherein the ratio of the length of the base member to the depth of the trough is at least 6.

3. A dumped random packing of elements according to claim 1 wherein the bridging member is strip-like and perforated by an aperture bridged by a further bridging member.

4. A dumped random packing according to claim 1 wherein the base member extends longitudinally to an extent of 170° to 190° about the first notional axis.

5. A dumped random packing of elements according to claim 1 wherein said base member has a base which is substantially flat transversely.

6. A dumped random packing of elements according to claim 1 wherein said base member has a base which is substantially flat transversely and has longitudinal grooves in the surface thereof.

7. A dumped random packing of elements according to claim 1 wherein said base member has a grooved or dimpled surface.

8. A dumped random packing of elements according to claim 1 each including a plurality of elongated apertures in said base member each bridged by a bridging member carried by said base member.

9. A dumped random packing of elements according to claim 1 each including a plurality of parallel elongated apertures and a plurality of parallel bridging members in said base member.

10. A dumped random packing for use in gas/liquid contact apparatus consisting of a plurality of packing elements, each packing element comprising an elongated trough-shaped base member having free ends and which arches longitudinally to an extent of 90° to 270° from one end of the base member to the other to form an open curved or polygonal shape, said trough-shaped base member having a base which is substantially flat transversely and the ratio of the length L of said base to the width W of said base being greater than 3, said trough-shaped base member having sidewalls on the edges of said base member defining spaced, parallel channels in the form of V-grooves where the sidewalls intersect the base, one near each edge of and extending longitudinally of said base member, said base including at least one elongate aperture bridged by a strip-like bridging member integral with the base member and itself arched from one end of the aperture to the other, the sense of the curvature of the base member being opposite to the sense of the curvature of the bridging member, said bridging member being perforated by an aperture and having a further bridging member bridging said aperture.

11. A dumped random packing for use in gas/liquid contact apparatus consisting of a plurality of packing elements each comprising: an elongate polygonal or curved trough-shaped base member having free ends and longitudinally extending from one free end to the other around a first notional axis to an extent of about 90° to about 270° to define a space which is at least partially enclosed by said base member, said base member having one or more elongated apertures for gas/liquid flow through said base member; and at least one bridging member carried by said base member extending around a second notional axis parallel to the first notional axis and in the opposite sense to the base member, at least partially through said space, said bridging member having an aperture and a bridging member bridging said aperture, said trough-shaped base member having a substantially flat base and sidewalls on the edges of said base member defining spaced, parallel liquid distribution channels, one near each edge of and extending longitudinally of said base member, and forming spacing members extending transversely of said first notional axis outwardly of said base member, the combination of said free ended, apertured base member and bridging member and bridging members integral therewith providing an open structure of low resistance to gas flow through said element and the trough-shape providing a structure which aids liquid distribution and provides strength to resist collapse of said element under compressive stresses in said dumped random packing.

* * * * *